April 17, 1934.  E. R. BARRETT  1,955,167
THREE WAY DUMPING BODY
Filed Nov. 5, 1929  7 Sheets-Sheet 4

Fig. 4.

Inventor
Edward R. Barrett
By Liverance and
Van Antwerp
Attorneys

Patented Apr. 17, 1934

1,955,167

UNITED STATES PATENT OFFICE 1,955,167

THREE WAY DUMPING BODY

Edward R. Barrett, Detroit, Mich., assignor to Wood Hydraulic Hoist & Body Company, Detroit, Mich., a corporation of Michigan Application November 5, 1929, Serial No. 404,895

14 Claims. (Cl. 298—18)

This invention relates to dumping bodies for trucks, and is particularly concerned with a novel construction relating to bodies which may be tilted to either side of the truck for side dumping, or to the rear to dump the contents of the body at the back of the truck.

It is an object and purpose of the present invention to provide a novel construction of control mechanism for the tilting body such that the driver of the truck may select the direction in which the body will be tilted and by operating the control mechanism insure that the body will be tilted in the desired direction. A further object of the invention is to provide means for automatically swinging the side of the body at the side toward which the contents is to be dumped in a downward direction, and in alinement with the bottom of the body and for automatically returning the same to vertical position when the body has been returned to its normal position above the truck chassis. It is a still further object and purpose of the invention to provide a novel form of latching means for the pivotally mounted sides or gates of the body so that when the driver of the truck moves the controlling device for selecting the direction of sidewise tilt of the body, the latch at the side where the contents of the body is to be dumped is automatically released and the side of the body turned outwardly during the dumping operation and when the body has been returned to its normal horizontal position after dumping said side of the body is automatically returned to closed position and the latch may then be reengaged so as to hold the previously released side against undesired movement.

A further object and purpose of the invention is to provide many novel constructions and combinations and arrangements of parts for effectively attaining the ends described in a practical and efficient manner.

An understanding of the invention may be had from the following description taken in connection with the accompanying drawings, in which.

Like reference characters refer to like parts in the different figures of the drawings.

The truck on which the dumping body is mounted may be of any conventional construction and includes the usual chassis side frame members 1 spaced apart from each other and forming parts of the truck frame. Transverse of and above the chassis members 1, two spaced apart bolsters are positioned and secured, one near the rear ends of the chassis members 1 and the other a short distance back of the cab of the truck. Each of these bolsters is made of sheet metal bent into U-shape and having vertical sides 2 connected by a top 3. The lower ends of the sides 2 have outturned flanges to lie against and be riveted or otherwise secured to the truck frame members 1.

At each end of each bolster a metal socket member 4 is located and permanently secured, lying between the sides 2 of the bolster. Each of the members 4 is provided with a horizontal opening 5 therethrough and a vertical opening 6a (see Fig. 2), the vertical openings being for the reception of downwardly extending pins on members 6 which are adapted to be removably received within the socket members 4 as shown in Figs. 2 and 8.

Figure 8:
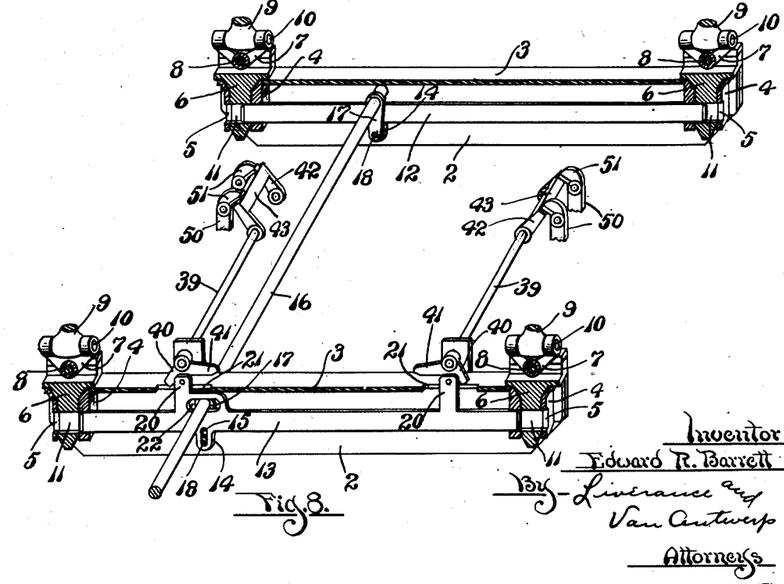

The members 6 at their upper ends are equipped with a universal joint structure comprising one joint member 7 which is pivotally mounted at the upper end of each member 6 to turn about a pivot pin 8, while the other member 9 of the universal joint structure is pivotally mounted at the upper end of the member 7 to turn about the axis of a pivot pin 10 which connects the members 7 and 9 as best shown in Fig. 8. The members 9 are secured in any suitable manner at their upper ends to the body which is mounted above the truck, the bottom of the body being located above the universal joint connections described.

Figure 1:
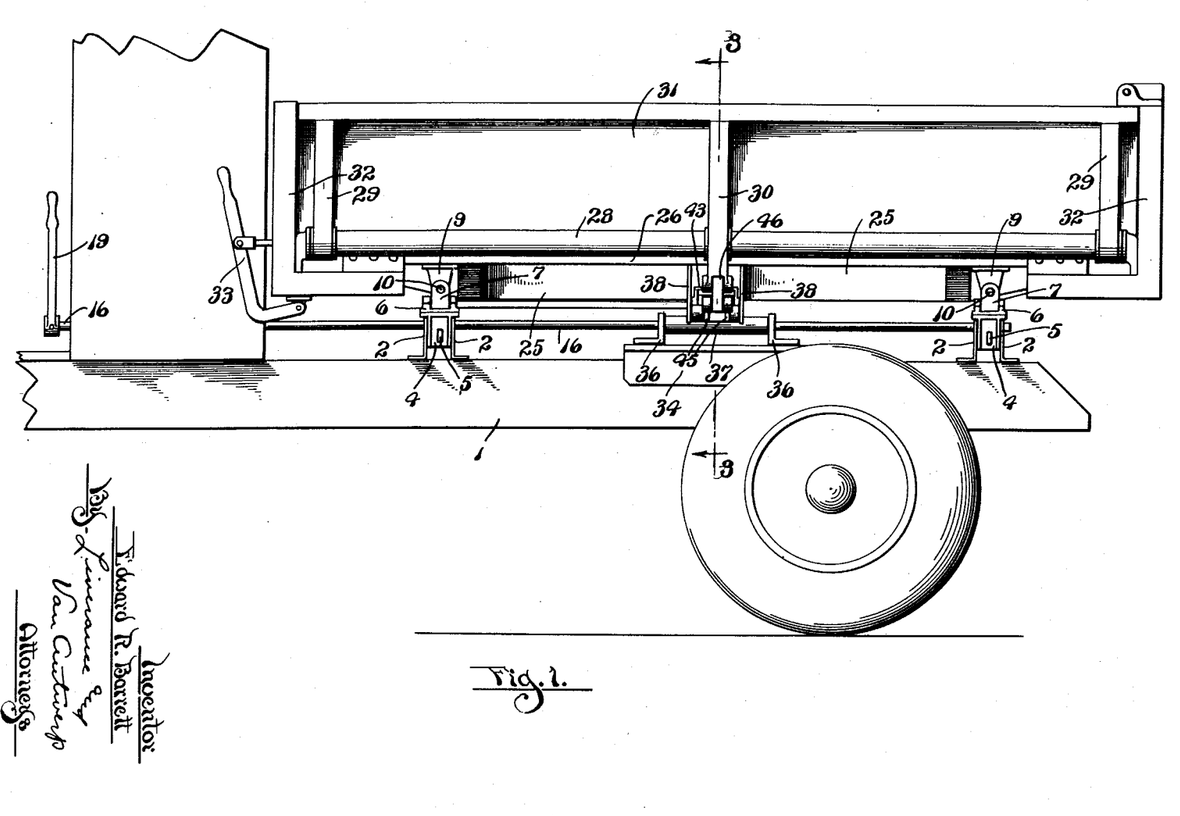
Fig. 1 is a side elevation of a truck equipped with the three way dumping body of my invention.
Figure 2:
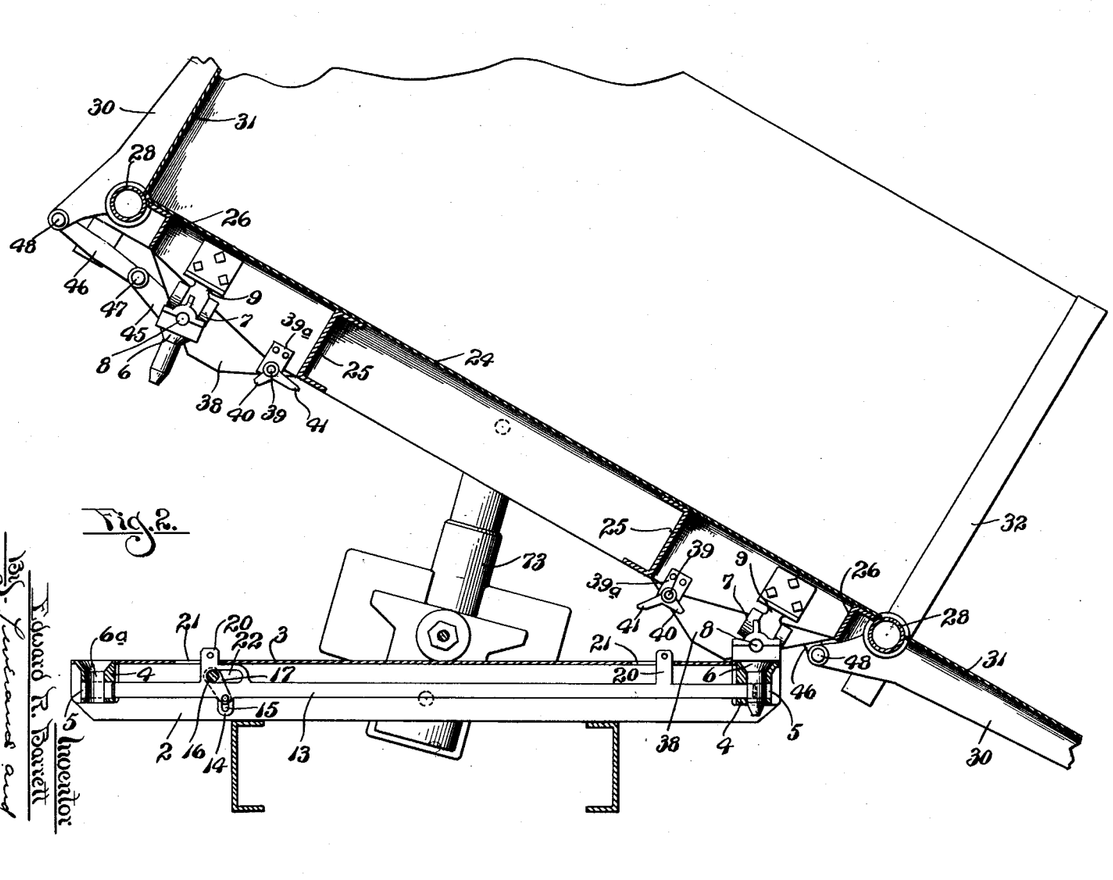
Fig. 2 is a transverse vertical section therethrough showing the body tilted to one side.

It is evident from this construction that the body may be tilted to the rear about the axis of the rear pins 10 or it may be tilted to either side about the axes of the side pins 8, and when tilting movement to the rear occurs the members 6 described are lifted out of and above the front socket members 4 which receive them, while when the body is tilted to a side, as shown in Fig. 2, the pins on the members 6 at one side of the body are lifted above the socket members 4 which normally receive them.

The pins depending from the members 6 which pass into the socket members 4 are provided with horizontal openings (see Fig. 8). A locking bar 12 extends between the rear socket members 4 and a similar locking bar 13 extends between the front socket members 4. The bar 13 is shorter than the bar 12 so that when both bars are in what may be termed their normal neutral position, the end portions of the rear bar 12 extend partly into the openings 11 in each of the pins 6 at the rear, while at the front the ends of the bar 13 do not extend into the openings 11 in the front pins 6. This is fully shown in Fig. 8 and it is this position of the locking bars 12 and 13 that the mechanism has when the body is to be tilted for rear dumping, both the front members 6 being free to be elevated, while the rear members 6 are locked securely in the rear socket members 4 so that they can not disengage therefrom.

Each of the bars 12 and 13 has a downwardly extending lug 14 in which a vertical slot 15 is cut. A rock shaft 16 extends lengthwise of the truck above the bars 12 and 13 and an arm 17 is secured to the rock shaft 16 adjacent each of the bars 12 and 13 so as to lie alongside of each lug 14. A pin 18 at the lower end of each arm 17 enters the slot 15 of the adjacent lug 14. The rock shaft is suitably mounted for rotation in the sides 2 of the supporting bolsters and in the front and rear of the cab of the truck, and at its front and in front of the cab a vertical operating lever 19 is secured so that the driver may rock the shaft 16 to either side of its neutral position shown in Fig. 8. When it is rocked to one side bar 12 disengages from the rear pin 6 at one side of the truck and moves farther into the other rear pin 6 at the opposite side, while the bar 13 which previously has been disconnected from both of the front pins is moved to connect with the pin 6 at the same side of the truck that the bar 12 has been further engaged with, so that the members 6 at one side of the truck are securely held against upward movement and both of the members 6 at the other side of the truck have been freed from rocking connection to their respective socket members 4 whereby the body can be tilted to one side by reason of such freeing of the members 6 at a side of the truck; and of course, when the rock shaft 16 is turned in the other direction, the situation with respect to locking and releasing the members 6 at a side of the truck is merely reversed so that the tilting of the truck will be to the opposite side.

The front bar 13 is provided with two spaced apart upwardly extending fingers 20 which pass through horizontal slots 21 made in the upper side 3 of the front supporting bolster. The front locking bar 13 is also formed with an enlarged portion adjacent one of the fingers 20 which portion has a horizontal slot 22 therein through which the rock shaft 16 passes (Fig. 8). This is for the purpose of supporting the front bar 13 at two spaced apart points at all times so that it cannot tilt downwardly and is necessary for the reason that the front bar 13 is shorter than the rear locking bar 12, which latter bar at all times is supported at both ends either in the rear members 6 or the socket members 4 associated therewith or by both. The fingers 20 which extend upwardly through the slots 21 at the front bolster each carry a roller or pin 23 on its rear side (see Fig. 3), serving to automatically operate the latches for the sides of the truck, releasing either one side or the other, dependent upon the direction of movement given to the bar 13 by the rock shaft, as will hereafter appear.

The body of the truck includes a flat bottom 24 of sheet metal which is secured on a suitable under structure which need not be specifically described in detail in the present application. In the under structure, however, are included channels 25 one near each side of the body. Also at the under side of and near each outer edge of the bottom 24 an angle support 26 is permanently secured. On suitable brackets 27 a tubular bar 28 is mounted for rotating movement on which are secured the vertical side posts 29 and 30 to which the sides 31 of the body are secured. The posts 29 are located near the front and rear ends of each side, and the intermediate post 30 is located substantially midway between the ends of a side 31 and each post 30 has a portion extending below the tubular member 28. The body includes front and rear stationary posts 32 and between the front posts a fixed front for the body is secured while the usual pivotally suspended tail gate, common in tilting dumping bodies, is mounted between the rear posts and may be latched in position in the usual manner, the control of the latch being through a lever 33 with a connecting rod running to the latch, the lever being disposed adjacent the cab for ready access for operation by the cab driver. The detail of the latch and of the tail gate is not shown and described as it is very old and well-known.

On each of the chassis side frame members 1 of the truck, an angle plate 34 is permanently secured at a point substantially midway between the ends of the body so as to come below the intermediate posts 30 of the pivotally mounted sides. On the horizontal flanges of the angle plates 34 and a filler block 35 above the upper flange of the chassis frame members 1 two spaced apart angle bars 36 are permanently secured between which, at each side of the truck, a roller or rounded member 37 is mounted, the locking control rod 16 passing closely adjacent but aside of one of said members 37, at one side of the truck.

Two spaced apart vertical metal plates 38 (see Fig. 7) are disposed between the under channels 25 and angle bars 26 at each side of the truck, the intermediate side posts 30 for the tilting sides 31 being located in a plane substantially equidistant from the plates 38. Two rods 39 pass at their rear ends through one of the plates 38 and extend forward to and above the upper side 3 of the front bolster described and at their front ends carry bell crank levers each comprising two arms 41 and 40 located approximately at something over a right angle to each other as shown. These rods 39 pass through and are supported at their front ends by plates 39a attached to a convenient portion of the supporting frame work for the bottom of the body (see Fig. 2). The bell crank members are located directly over the pins or rollers 23 carried by the fingers 20 and it is evident that on longitudinal movement of the locking bar 13 to the right (Fig. 8) the finger 40 on the bell crank at the right will be engaged to turn its connected shaft 39 and, this turning movement depressing the connected arm 41;

when the bar 13 is returned to its normal neutral position, the shaft 39 which has been rocked will again be rocked back to its normal position; and during such movement of the bar 13 to the right no movement will be imparted to the other shaft 39, this occurring only when bar 13 is moved to the left from normal position in Fig. 8.

Figure 7:
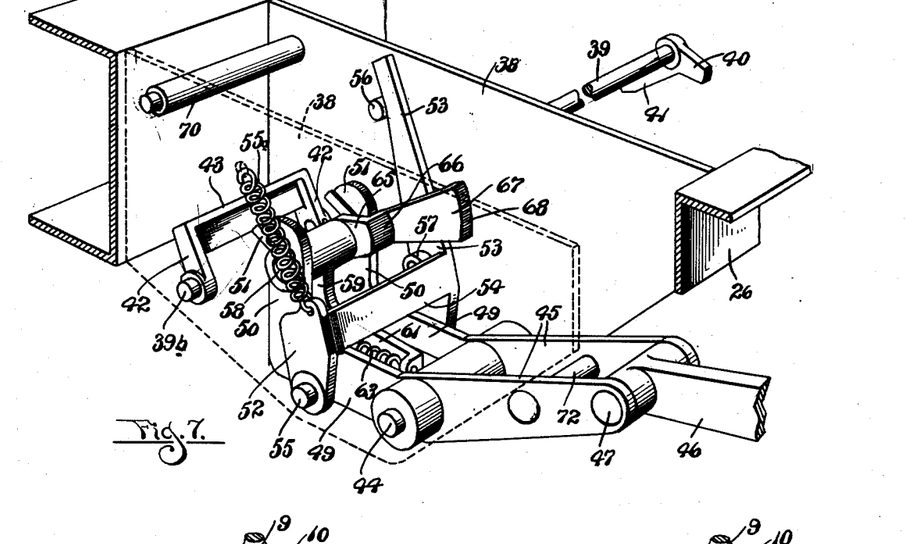
Fig. 7 is a fragmentary enlarged perspective view of the latching and side operating mechanisms, one of which is located at each side and below the bottom of the body, and, Fig. 8 is a fragmentary perspective, with parts in section, illustrative of the selective control devices for selecting the direction of tilting movement of the body.

The rock shafts 39 at their rear ends carry latch members in the form of U-shaped stirrups comprising spaced apart sides 42 connected by a horizontal latch bar 43. These latch members are pivotally mounted between the plates 38 on the rods 39 which extend through one of the plates and pivots 39b which pass through the other plate as indicated in Fig. 7. On a shaft or rod 44 which extends between and is carried by the plates 38 at each side of the truck a second or co-operating latch member is pivotally mounted. As shown in Fig. 7 this latch member includes two spaced apart arms 45 which extend outward from the pivot rod 44, between the outer ends of which a link 46 is pivotally mounted at one end at 47, the opposite end of the link having a pivotal connection at 48 to the lower end of the adjacent side post 30. From the pivot rod 44 in the opposite direction two substantially horizontal arms 49 extend inwardly for a distance, are then turned in a vertical direction, making vertical sections or arms 50, which terminate in inwardly turned dogs 51 underneath which the latch bar 43 of the adjacent latch is designed to engage; and when thus engaged the side 31 with which the post 30 is connected is held in vertical position and cannot be turned outwardly. It is, of course, to be understood that this structure which has been and is being described is duplicated for each side of the body and the description with respect to the structure at one side will serve for both.

Between the plates 38 two arms 52 and 53 integrally connected by cross bar 54 are pivotally mounted, the arms having pivots 55 at their lower ends mounted in openings in the plates 38. The arm 53 lies adjacent the inner side of the front plate 38 and is considerably longer than the arm 52 and is normally held against a stop pin 56 by a spring 55a connected to the arm 52 and to the opposite plate 38. The arm 53 at its inner side also carries a roller 57 located inside of the bar 54 as shown.

The upper ends of the sections 50 of the second latch member carry a rod 58 on which an irregularly shaped member is mounted for pivotal movement. It includes a sleeve located around the rod 58 from which an arm 59 extends downwardly, it at its lower end being equipped with a laterally turned cam member 60 having a curved underside adapted to bear against the adjacent member or roller 37. An arm 61 extends outwardly from the arm 59 lying above and normally bearing upon a horizontal cross bar 62 connecting the sides 49 described and ordinarily held thereagainst by a coiled spring 63 attached at one end to the free end of the arm 61 and at the opposite end to a lug 64 extending inwardly from the adjacent part 50 of the second latch member described.

At the front end of the sleeve around the rod 58 a member 65 projects outwardly for a short distance is then turned in a forward direction over the adjacent dog 51, as indicated at 66, and then again extends radially outward making the part 67 which has a curved outer edge 68. Said part 67 lies directly over the roller 57 previously described.

Figure 5:
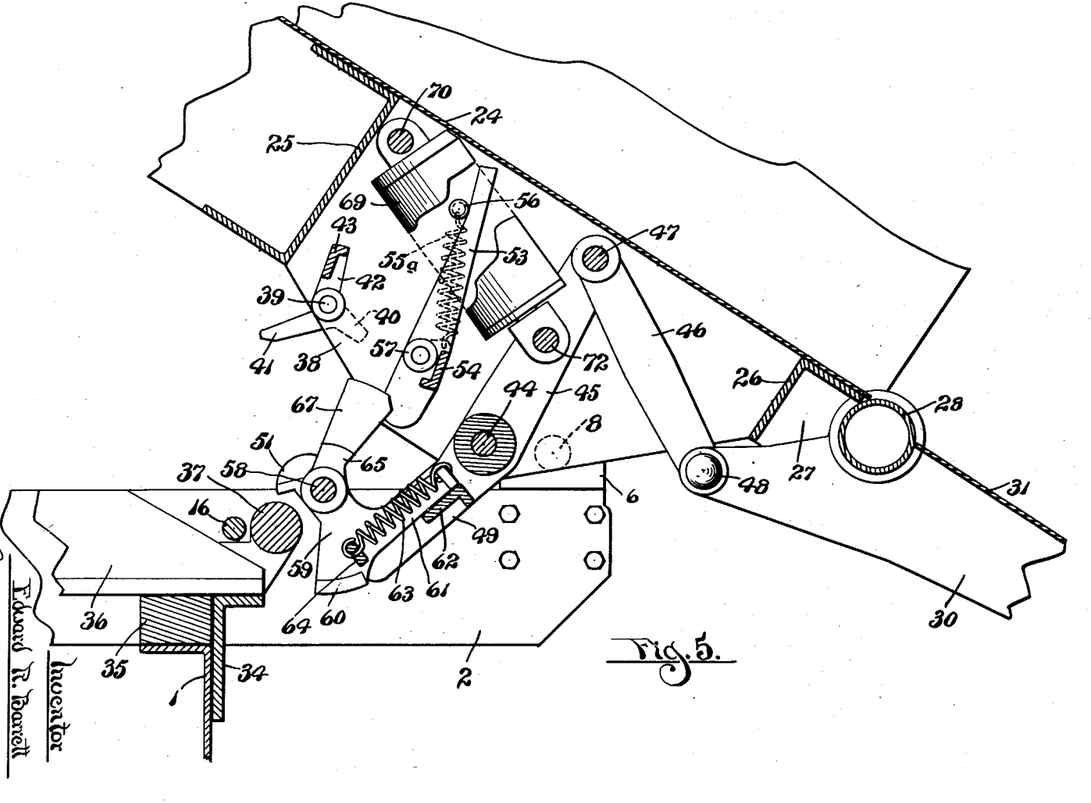
Fig. 5 is a view similar to Figs. 3 and 4 illustrating the position of the parts when the body has been tilted to a still further stage.

An air cylinder 69 is located between the plates 38 and has a pivotal mounting at 70 at one end. A piston rod 71 enters the cylinder at the opposite end and has the usual piston connected thereto within the cylinder, said piston rod being pivotally mounted on a cross rod 72 carried by and between the two arms 45 of the second latching member. This air cylinder comes into action after the cam member 60 has left its roller, 37, as shown in Fig. 5, and prevents a rapid dropping of the side member 30.

The body is designed to be tilted by a hydraulic extensible hoisting mechanism shown at 73 in Fig. 2, and with which the body may be tilted to either side or to the rear. The specific construction of the hoisting mechanism shown at 73 is the subject matter of a prior application for a patent filed by me, having Ser. No. 367,188 filed May 31, 1929 and its detail of structure need not be entered into in this application. It is sufficient to say that on extension of the hoisting apparatus, should the arrangement of the locking bars be that shown in Fig. 8, the body will be tilted about the rear transverse pivots 10 and the contents of the body dumped at the rear of the truck. If, however, the driver of the truck turns the rock shaft 16 so as to release the members 6 at one side of the truck and lock both of those at the other side, the body will be tilted toward that side of the truck where the members 6 are locked and lifted at that side where the members 6 have been released.

Figure 3:
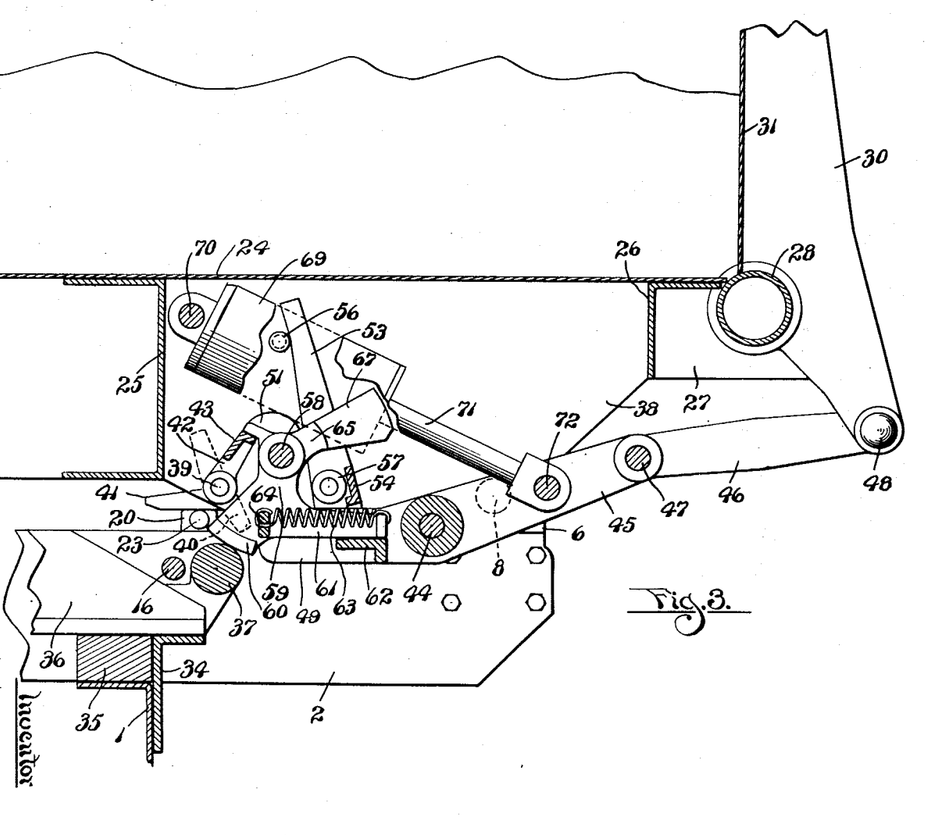
Fig. 3 is a fragmentary enlarged transverse vertical section taken substantially on the plane of line 3—3 of Fig. 1, and at one side of the body, illustrating the position of the parts when the body is in normal horizontal position and the sides latched against movement.
Figure 4:
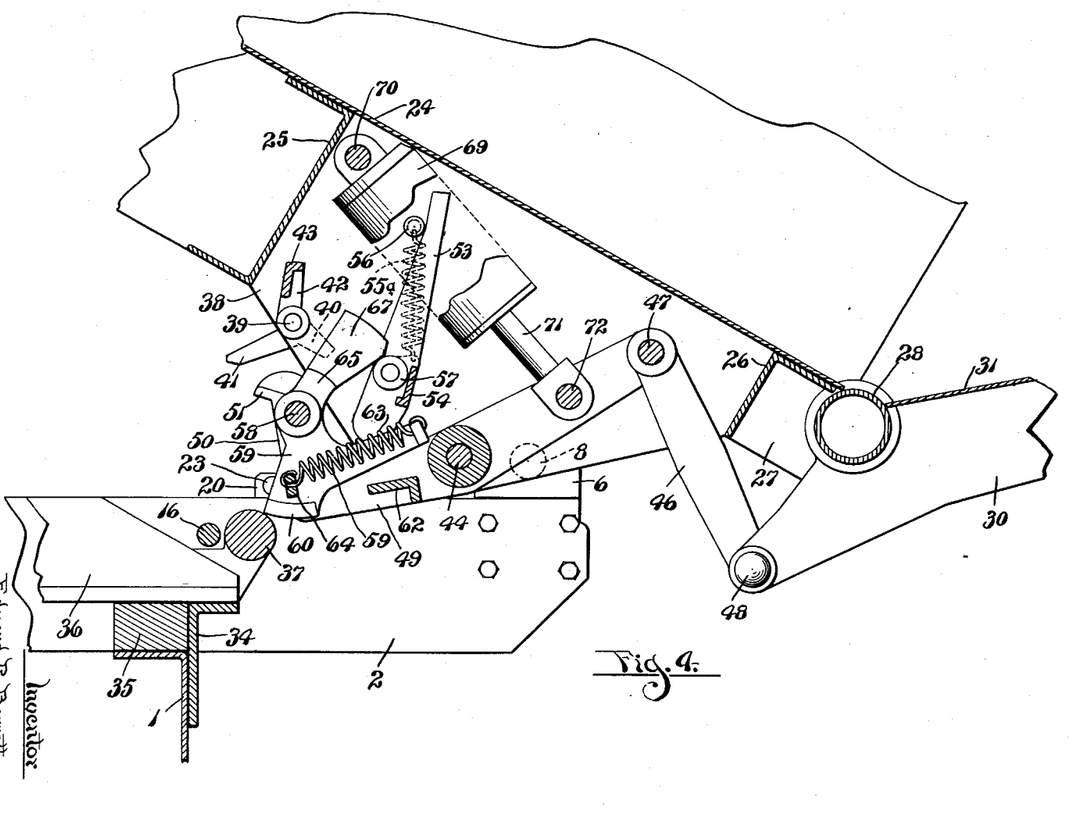
Fig. 4 is a view similar to that shown in Fig. 3 showing the body partly tilted to one side or intermediate its normal horizontal position and the final tilted position.

When the handle 19 has been operated to unlock the rear member 6 at one side and lock the front member 6 at the opposite side there simultaneously occurs a rocking movement of the shaft 39 opposite the side that is to be lifted, whereby the connected latch bar at 43 is disconnected from the dogs 51, that is, the latch bar 43 is moved from the full line position shown in Fig. 3, in a counterclockwise direction so as to disengage from the dogs at 51. The extension of the hoisting device 73 tilts the body to one side, the cam at 60 bearing against the member 37, and the parts taking the position shown in Fig. 4 with a turning movement of the second latch member about the axis of the rod 44, and a partial opening of the side 31 as shown in Fig. 4, the roller 57 riding against the outer edge of the part 67 and gradually permitting the side 31 to gravitate toward open position. This continues until the bottom 24 of the body reaches an angle of approximately 30 degrees to the horizontal at which time the roller 57 reaches the upper curved edge 68 of the member 67, and near the end of this movement the roller 57 causes tripping to occur between the cam at 60 and the member 37 thus releasing the irregular shaped member against which the roller 57 bears, whereupon the side 31 moves so that it lies in the same inclined plane as the bottom 24 of the body. This occurs when the angle of the bottom of the body to the horizontal is such the contents of the load carried by the body is about ready to slide by gravity outward, that is, the critical angle for the contents is being approached. When this occurs there is a relatively rapid movement of the side 31 from the position shown in Fig. 4 to that shown in Fig. 5, checked somewhat by the dash-pot arrangement provided by the air cylinder 69 and associated parts in order to eliminate shocks.

Figure 6:
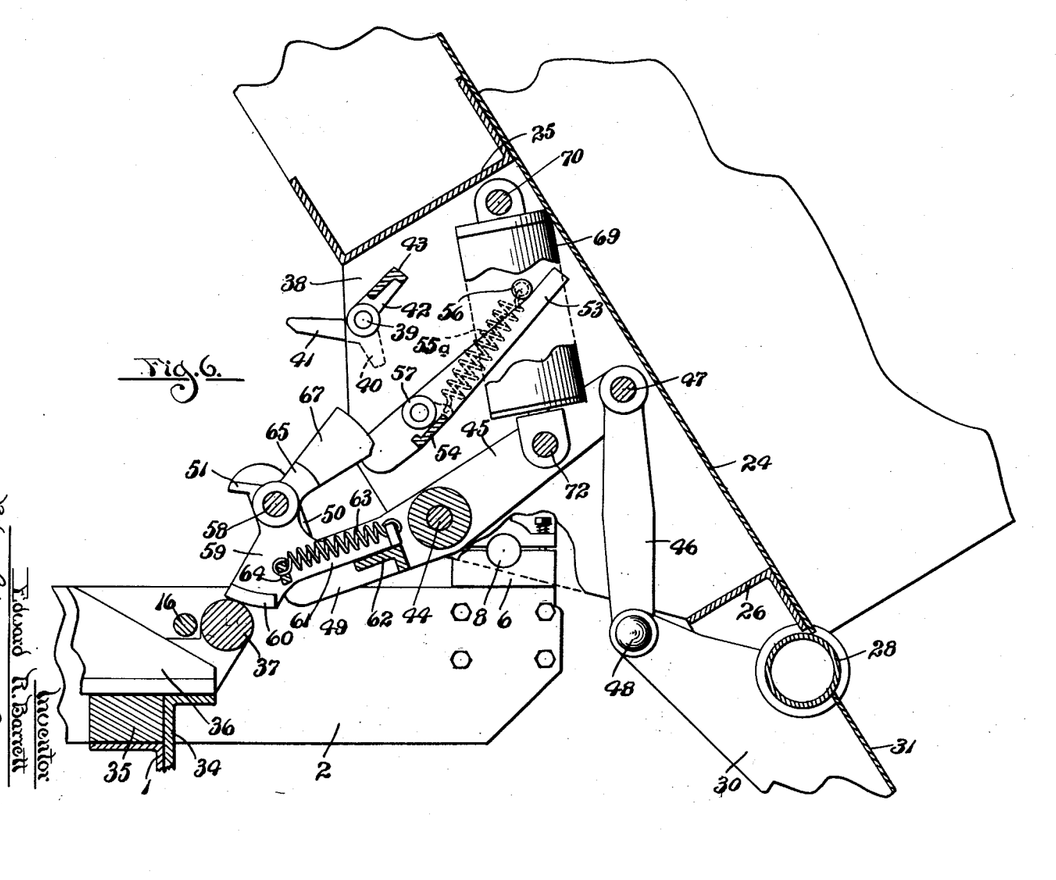
Fig. 6 is a view similar to that shown in Figs. 3, 4 and 5 with the body tilted to one side to its extreme tilted position.

With a continuance of the elevating movement of the hoisting apparatus 73, the parts mounted on the body are lifted and all turned in a clockwise direction about the axis of the pins 8, elevating the arm 59 and bringing its radial side against the roller or rounded member 37 until the body has reached its extreme position, as in Fig. 6, at this point the spring 63, which has been tensioned by rotation of the irregularly shaped member, causes the curved cam shoe 60 to return to its position above said member 37 and remain there, compelling an automatic return of the side 31 to right angle position with respect to the bottom of the body when the body is returned to its normal position, and when the body has been returned to its normal position the rock shaft 16 may then be actuated to lock both rear members 6 and release both front members 6 as in Fig. 8.

There is accordingly had, by means of the construction described, a power of selection to which side the body shall be tilted, coupled with an automatic unlatching of the side of the body which is to be turned outwardly and extend beyond the truck wheels so as to carry the load which is dumped beyond said wheels to not interfere therewith, together with a control of the opening movement of the side of the body so that it will open rapidly a short period before the load contents start to slide outwardly, remaining in full open position until the body has been tilted to its extreme position and then closing progressively when the body is returned to its normal position above the truck chassis.

The construction described has, after extensive tests, proved to be efficient and durable in all respects. The mechanism shown underneath the body between the plates 38 is protected against fouling from materials which may be carried by the body such as dirt, gravel, cementitious mixtures or the like, and is protected so that it is capable of withstanding the severe usage to which it is put for an indefinite period. The invention is defined in the appended claims and is to be considered comprehensive of all forms of structure coming within their scope.

I claim:

1. In a construction of the class described, a truck frame, a body mounted on and above said truck frame for selective tilting movement to either side about horizontal axes located one adjacent each side of the truck frame, vertical sides on said body pivotally mounted thereon at their lower edges and lengthwise of the body, means for tilting the body to either side, latching means for holding the sides of the body in normal vertical position, means for controlling the particular axis about which the body tilts and for simultaneously unlatching the side of the body adjacent the axis about which the body is tilted, and means for turning said unlatched side downwardly and outwardly as the body is tilted.

2. In a construction of the class described, a truck frame, a body mounted thereon including a bottom, a front and two vertical sides pivotally mounted at their lower edges adjacent the side edges of said bottom, means for mounting the body on the frame for side tilting movements, manually operable means for latching said sides in vertical position when the body is in normal horizontal position, manually operable means for controlling the chosen axis about which the body tilts and for simultaneously unlatching one side thereof at the side adjacent the axis about which the body is to tilt, means for tilting the body, and means for automatically turning said unlatched side outwardly as the body is tilted.

3. A construction of the class described, a truck frame, two pairs of vertical socket members mounted on said frame, one pair located near the rear end of the frame, and the other in front thereof, pins insertible in said socket members, a body located above the frame, means pivotally connecting the pins to the bottom of the body whereby the body may be tilted to either side, locking bars located between the front and rear pairs of socket members, said socket members and pins therein having alined openings to receive the ends of the bars, manually operable means for moving the bars lengthwise in either direction to lock the pins at one side of the truck frame in their socket members and release the pins at the opposite side of the frame, sides on said body pivotally mounted thereon to turn about axes located at the lower edges of said sides, a latching member connected with each of said sides of the body, a cooperating latching member to engage with the first named latching member mounted on and under said body at each side thereof, and means on one of said locking bars operably associated with the second mentioned latching member to turn the same to unlatch it from the first latching member for a side of the body upon operation of said locking bars to lock the pins at the same side of the truck frame with their socket members.

4. In a construction of the class described, a truck frame, two pairs of vertical socket members mounted on the frame in spaced apart relation, one pair at the rear of the frame and the other in front of the first pair, pins insertible in the socket members at their upper ends, said socket members and pins having aligned openings therethrough, a truck body located over the frame, means for pivotally connecting the pins to the bottom of the truck body, whereby the body may be tilted to either side, front and rear locking bars slidably mounted on the truck frame, one bar between each pair of the socket members and pins and adapted to slidably engage the openings therein, means for moving the bars longitudinally in either direction to lock the pins at one side of the truck frame with their socket members and release the others at the opposite side, vertical sides to said truck body pivotally mounted for downward and outward swinging movement at their lower edges, two rock shafts carried on and below the body one near each side thereof, bell crank levers at one end of the rock shafts, means extending upwardly from one of said locking bars to engage with the bell crank levers to rock said rock shafts, one on one direction of movement of the locking bar and the other on the other direction of movement thereof, a latching member on each of the rock shafts, a second latching member mounted below the body toward each side thereof for engagement with the first named latching member, and connections between the second latching members and the sides of the body whereby when the body is in normal horizontal position both sides may be latched against movement, and on movement of the locking bars in one direction to lock the pins at one side of the truck frame with their socket members, the first named latching member at the same side of the truck being moved to disengage from its cooperating latching member connected with the adjacent vertical side of the body.

5. In a construction of the class described, a truck frame, a body located above the truck frame, two pairs of socket members on said truck frame, one pair near the rear end thereof and the other in front of the first pair, pins insertible into said socket members, means connecting said pins by a universal joint connection with the bottom of said body, means for locking either the rear pair of pins with their socket members or the pins at either side of the construction with the socket members at the sides of the truck frame, means for tilting the body either to the rear or to either side depending upon which pins are locked with the socket members, vertical sides for said body pivotally mounted thereon for downward and outward turning movement about axes at the lower edges of said sides, means for latching said sides against turning movement, means for operating said latch means to latch the sides against movement with the rear pair of pins locked with their sockets, means for selectively unlatching either side of the body upon locking the pins to the socket members at the same side of the truck frame, and means for automatically turning the unlatched side of the body downward and outward upon tilting the body to deliver its contents.

6. In a construction of the class described, a truck frame, a body mounted thereon, means for selectively tilting the body to either side, vertical sides for said body pivotally mounted thereon for downward and outward turning movement about axes located adjacent the lower edges of said sides, members pivotally mounted on and below the body, link connections between one end of each of said members and the adjacent side of the body, a support carried by the truck at each side thereof, means mounted on each of said members bearing upon said support whereby in tilting movement of said body to one side thereof said means riding on said support controls the downward and outward movement of the adjacent side of the body, moving the same downwardly and outwardly uniformly for a portion of the body tilting movement and when said means disengages from the support permitting the side of the body to open to its extreme limit.

7. In a construction of the class described, a truck frame, a body located above the truck frame, means for mounting the body on the truck frame for tilting movements to the rear or to either side, manually operable means for selectively controlling the direction of tilting movement of the body, vertical sides to said body pivotally mounted thereon for downward and outward turning movement about longitudinal axes at the lower edges of said sides, latching means for holding the sides in vertical position, means for automatically operating said latching means to release a selected side of the body upon selection of tilting of said body to the same side of the truck, hoisting means for tilting the body, and means for automatically controlling the downward and outward pivotal movement of the unlatched side thereof to turn the same uniformly during the first part of tilting movement of the body and thereafter tilt said body and side together to the extreme tilted position of the body.

8. In combination, a frame, a body mounted on said frame so as to pivot on said frame, a swinging side on said body adapted to gravitate to open position as said body is moved relatively to said frame and means for controlling the rate of movement of the said swinging side, said means permitting a rapid movement at a predetermined position of the side.

9. In combination, a frame, a body mounted on said frame so as to pivot on said frame, a swinging side on said body adapted to gravitate to open position as said body is moved relatively to said frame, means for controlling the rate of movement of the said swinging side during only a portion of its downward movement, and additional means for controlling the said swinging side during another portion of its downward stroke.

10. A combination of elements as set forth in claim 9 in which said additional means includes an air cylinder.

11. In combination, a frame, a body mounted on said frame so as to pivot on said frame, a swinging side on said body adapted to gravitate to open position as said body is moved relatively to said frame, means for controlling the rate of movement of the said swinging side during the first portion of its downward movement and means for tripping said first mentioned means to permit said swinging side to gravitate downwardly without hindrance.

12. A combination of elements as set forth in claim 11 but also having a dash-pot construction to check the final movement of the said swinging side.

13. In a construction of the class described, a truck frame, a body located above said truck frame and mounted thereon for tilting movement to either side, means for selectively locking the body at one side and releasing it at the other whereby it may be tilted, vertical sides to said body pivotally mounted thereon for outward and downward turning movements about axes at their lower edges, means for latching said sides against movement, means for automatically unlatching one side upon locking the body at the same side thereof against upward movement and releasing the body at the other side for upward tilting movement, means for tilting the body and means for automatically turning the unlatched side downward and outward with said tilting movement.

14. In a construction of the class described, a truck frame, a body located above said truck frame and mounted thereon for tilting movement to either side, means for selectively locking the body at one side and releasing it at the other whereby it may be tilted, vertical sides to said body pivotally mounted thereon for outward and downward turning movements about axes at their lower edges, means for latching said sides against movement, means for automatically unlatching one side upon locking the body at the same side thereof against upward movement and releasing the body at the other side for upward tilting movement, means for automatically turning said unlatched side of the body downward and outward, and means for controlling the downward and outward movement of said side whereby it is progressively and substantially uniformly turned downward and outward during the first part of the tilting movement of the body, is then immediately and rapidly turned to a position in the same plane with the bottom of the body, and is thereafter turned with the further tilting of the body in the same plane with the bottom thereof.

EDWARD R. BARRETT.